United States Patent
Craig et al.

(10) Patent No.: US 8,504,630 B2
(45) Date of Patent: Aug. 6, 2013

(54) METHODS, SYSTEMS, AND COMPUTER READABLE MEDIA FOR DIAMETER APPLICATION LOOP PREVENTION

(75) Inventors: Jeffrey Alan Craig, Durham, NC (US); Mark Edward Kanode, Apex, NC (US); Thomas M. McCann, Raleigh, NC (US); Donald E Wallace, Evergreen, CO (US)

(73) Assignee: Tekelec, Inc., Morrisville, NC (US)

( * ) Notice: Subject to any disclaimer, the term of this patent is extended or adjusted under 35 U.S.C. 154(b) by 252 days.

(21) Appl. No.: 13/026,162

(22) Filed: Feb. 11, 2011

(65) Prior Publication Data
US 2011/0202614 A1 Aug. 18, 2011

Related U.S. Application Data

(60) Provisional application No. 61/304,310, filed on Feb. 12, 2010.

(51) Int. Cl.
*G06F 15/16* (2006.01)

(52) U.S. Cl.
USPC ........... 709/206; 709/203; 709/220; 709/224; 370/248; 370/389

(58) Field of Classification Search
USPC .................. 709/206, 220, 224, 228; 370/248, 370/389
See application file for complete search history.

(56) References Cited

U.S. PATENT DOCUMENTS

| | | | |
|---|---|---|---|
| 5,228,083 A | 7/1993 | Lozowick et al. | |
| 5,719,861 A | 2/1998 | Okanoue | |
| 6,157,621 A | 12/2000 | Brown et al. | |
| 6,273,622 B1 | 8/2001 | Ben-David | |
| 6,304,273 B1 | 10/2001 | Bonnet | |
| 6,584,073 B1 | 6/2003 | Steele, Jr. et al. | |
| 6,795,546 B2 | 9/2004 | Delaney et al. | |
| 6,865,153 B1 | 3/2005 | Hill et al. | |
| 6,915,345 B1 | 7/2005 | Tummala et al. | |
| 6,918,041 B1 | 7/2005 | Chen | |

(Continued)

FOREIGN PATENT DOCUMENTS

| | | |
|---|---|---|
| EP | 1 134 939 A1 | 9/2001 |
| EP | 1 328 102 A1 | 7/2003 |

(Continued)

OTHER PUBLICATIONS

Final Official Action for U.S. Appl. 13/026,076 (Dec. 7, 2012).

(Continued)

*Primary Examiner* — Khanh Dinh
(74) *Attorney, Agent, or Firm* — Jenkins, Wilson, Taylor & Hunt, P.A.

(57) ABSTRACT

According to one aspect, the subject matter described herein includes a method for providing Diameter application loop prevention. The method includes steps occurring at a first Diameter node. The method further includes receiving a first Diameter message that is to be sent to a destination. The method also includes determining whether the first Diameter message requires processing by a Diameter application. The method includes, in response to determining that the first Diameter message requires processing by the Diameter application, determining whether the first Diameter message has been processed by the Diameter application. The method further includes, in response to determining that the first Diameter message has been processed by the Diameter application, preventing the first Diameter message from being sent to the Diameter application for processing.

29 Claims, 7 Drawing Sheets

U.S. PATENT DOCUMENTS

| | | | |
|---|---|---|---|
| 6,954,790 B2 | 10/2005 | Forslöw | |
| 6,967,956 B1 | 11/2005 | Tinsley et al. | |
| 7,042,877 B2 | 5/2006 | Foster et al. | |
| 7,043,000 B2 | 5/2006 | Delaney et al. | |
| 7,136,635 B1 | 11/2006 | Bharatia et al. | |
| 7,257,636 B2 | 8/2007 | Lee et al. | |
| 7,286,516 B2 | 10/2007 | Delaney et al. | |
| 7,292,592 B2 | 11/2007 | Rune | |
| 7,298,725 B2* | 11/2007 | Rune | 370/338 |
| 7,333,438 B1 | 2/2008 | Rabie et al. | |
| 7,333,482 B2 | 2/2008 | Johansson et al. | |
| 7,383,298 B2 | 6/2008 | Palmer et al. | |
| 7,403,492 B2 | 7/2008 | Zeng et al. | |
| 7,403,537 B2 | 7/2008 | Allison et al. | |
| 7,466,807 B2 | 12/2008 | McCann et al. | |
| 7,551,926 B2 | 6/2009 | Rune | |
| 7,567,796 B2 | 7/2009 | Tammi et al. | |
| 7,583,963 B2 | 9/2009 | Tammi et al. | |
| 7,590,732 B2* | 9/2009 | Rune | 709/225 |
| 7,633,872 B2 | 12/2009 | Pitcher et al. | |
| 7,633,969 B2 | 12/2009 | Caugherty et al. | |
| 7,706,343 B2 | 4/2010 | Delaney et al. | |
| 7,792,981 B2 | 9/2010 | Taylor | |
| 7,822,023 B2 | 10/2010 | Lahetkangas et al. | |
| 7,894,353 B2 | 2/2011 | Li et al. | |
| 7,898,957 B2 | 3/2011 | Lea et al. | |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,041,021 B2 | 10/2011 | Xu et al. | |
| 8,045,983 B2 | 10/2011 | Bantukul | |
| 8,170,035 B2 | 5/2012 | Furey et al. | |
| 8,170,055 B2 | 5/2012 | Fang et al. | |
| 2001/0024443 A1 | 9/2001 | Alriksson et al. | |
| 2002/0049901 A1 | 4/2002 | Carvey | |
| 2002/0051427 A1 | 5/2002 | Carvey | |
| 2002/0087723 A1 | 7/2002 | Williams et al. | |
| 2002/0133494 A1 | 9/2002 | Goedken | |
| 2002/0133534 A1 | 9/2002 | Forslow | |
| 2002/0141346 A1 | 10/2002 | Garcia-Luna-Aceves et al. | |
| 2002/0181507 A1 | 12/2002 | Jones | |
| 2003/0095536 A1 | 5/2003 | Hu et al. | |
| 2003/0115358 A1 | 6/2003 | Yun | |
| 2004/0037278 A1 | 2/2004 | Wong et al. | |
| 2004/0042485 A1 | 3/2004 | Gettala et al. | |
| 2004/0098612 A1 | 5/2004 | Lee et al. | |
| 2005/0002417 A1 | 1/2005 | Kelly et al. | |
| 2005/0099964 A1 | 5/2005 | Delaney et al. | |
| 2005/0232236 A1 | 10/2005 | Allison et al. | |
| 2005/0232407 A1 | 10/2005 | Craig et al. | |
| 2005/0235065 A1 | 10/2005 | Le et al. | |
| 2005/0246545 A1 | 11/2005 | Reiner | |
| 2005/0246716 A1* | 11/2005 | Smith et al. | 719/315 |
| 2006/0045249 A1 | 3/2006 | Li et al. | |
| 2006/0077926 A1 | 4/2006 | Rune | |
| 2006/0101159 A1 | 5/2006 | Yeh et al. | |
| 2006/0104210 A1 | 5/2006 | Nielsen | |
| 2006/0123477 A1 | 6/2006 | Raghavan et al. | |
| 2006/0172730 A1 | 8/2006 | Matsuda | |
| 2006/0177007 A1 | 8/2006 | Vaghar et al. | |
| 2006/0200670 A1 | 9/2006 | Kuffel et al. | |
| 2006/0221972 A1 | 10/2006 | Bhargava et al. | |
| 2006/0253563 A1 | 11/2006 | Yang et al. | |
| 2006/0274744 A1 | 12/2006 | Nagai et al. | |
| 2007/0047539 A1 | 3/2007 | Agarwal et al. | |
| 2007/0153995 A1 | 7/2007 | Fang et al. | |
| 2007/0168421 A1 | 7/2007 | Kalyanpur et al. | |
| 2007/0214209 A1 | 9/2007 | Maeda | |
| 2007/0280447 A1 | 12/2007 | Cai et al. | |
| 2007/0297419 A1 | 12/2007 | Askerup et al. | |
| 2008/0025230 A1 | 1/2008 | Patel et al. | |
| 2008/0039104 A1 | 2/2008 | Gu et al. | |
| 2008/0144602 A1 | 6/2008 | Casey | |
| 2008/0167035 A1 | 7/2008 | Buckley et al. | |
| 2008/0301162 A1 | 12/2008 | Wall et al. | |
| 2008/0317247 A1 | 12/2008 | Jeong et al. | |
| 2009/0080440 A1 | 3/2009 | Balyan et al. | |
| 2009/0129271 A1 | 5/2009 | Ramankutty et al. | |
| 2009/0138619 A1 | 5/2009 | Schnizlein et al. | |
| 2009/0185494 A1 | 7/2009 | Li et al. | |
| 2009/0193071 A1* | 7/2009 | Qiu et al. | 709/203 |
| 2009/0232011 A1 | 9/2009 | Li et al. | |
| 2010/0042525 A1 | 2/2010 | Cai et al. | |
| 2010/0135287 A1 | 6/2010 | Hosain et al. | |
| 2010/0265948 A1 | 10/2010 | Patel et al. | |
| 2010/0299451 A1 | 11/2010 | Yigang et al. | |
| 2011/0060830 A1 | 3/2011 | Kang et al. | |
| 2011/0116378 A1 | 5/2011 | Ramankutty et al. | |
| 2011/0116382 A1 | 5/2011 | McCann et al. | |
| 2011/0188397 A1 | 8/2011 | McCann et al. | |
| 2011/0199895 A1 | 8/2011 | Kanode et al. | |
| 2011/0199906 A1 | 8/2011 | Kanode et al. | |
| 2011/0200047 A1 | 8/2011 | McCann et al. | |
| 2011/0200053 A1 | 8/2011 | Kanode et al. | |
| 2011/0200054 A1 | 8/2011 | Craig et al. | |
| 2011/0202604 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1* | 8/2011 | Graig et al. | 709/206 |
| 2011/0202676 A1* | 8/2011 | Craig et al. | 709/238 |
| 2011/0202677 A1 | 8/2011 | Craig et al. | |
| 2011/0202684 A1 | 8/2011 | Craig et al. | |
| 2011/0225280 A1 | 9/2011 | Delsesto et al. | |
| 2011/0225306 A1 | 9/2011 | Delsesto et al. | |
| 2011/0302244 A1 | 12/2011 | McCann et al. | |
| 2011/0314178 A1 | 12/2011 | Kanode et al. | |
| 2012/0155389 A1 | 6/2012 | McNamee et al. | |
| 2012/0224524 A1 | 9/2012 | Marsico | |

FOREIGN PATENT DOCUMENTS

| | | |
|---|---|---|
| EP | 1 465 385 A1 | 10/2004 |
| EP | 1 314 324 B1 | 8/2008 |
| EP | 2 716 544 A1 | 12/2010 |
| EP | 1 847 076 B1 | 2/2012 |
| WO | WO 2008/087633 A2 | 7/2008 |
| WO | WO 2009/058067 A1 | 5/2009 |
| WO | WO 2009/070179 A1 | 6/2009 |
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100629 A2 | 8/2011 |
| WO | WO 2012/119147 A1 | 9/2012 |

OTHER PUBLICATIONS

Communication of European Publication Number and Information on the Application of Article 67(3) EPC for European Patent Application No. 11742912.6 (Nov. 21, 2012).

Communication of European Publication Number and Information on the Application of Article 67(3) EPC for European Patent Application No. 11742905.0 (Nov. 21, 2012).

Communication of European Publication Number and Information on the Application of Article 67(3) EPC for European Patent Application No. 11742894.6 (Nov. 21, 2012).

Final Official Action for U.S. Appl. No. 12/906,816 (Feb. 21, 2012).

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Notification of Transmittal of the International Search Report and the Written Opinion of the International Searching Authority, or the Declaration for International Application No. PCT/US2010/053062 (Jun. 28, 2011).
Znaty, "DIAMETER, GPRS, (LTE+ePC=EPS), IMS, PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknow) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Groth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP based and Diameter based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TS 29.909 V9.0.0 (Dec. 2009).
3GPP, "3rd Generation Partnership Project; Technical Specification Group Core Network and Terminals; Sh Interface Based on the Diameter Protocol; (Release 9)," 3GPP TS 29.329 V9.0.0 (Dec. 2009).
3GPP, "3rd Generation Partnership Project; Technical Specification Group Core Network and Terminals; IP Multimedia (IM) Subsytem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control Over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).

Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Netword Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarification," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al, "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TR 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication date unknown).
Final Official Action for U.S. Appl. No. 13/026,105 (Nov. 26, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and the information on the application of Article 67(3) EPC for European Application No. 10824243.9 (Jul. 25, 2012).
Notification of Transmittal of the International of the International Search Report and the Written Opinion of the International Searching Authority, or the Declaration for International Patent Application No. PCT/US2012/027739 (Jun. 12, 2012).
Traffix Systems, "Datasheet; Traffix Signaling Delivery Controller (SDC)," pp. 1-5 (May 2011).
Notice of Allowance and Fee(s) Due for U.S. Appl. No. 13/026,098 (Mar. 11, 2013).
Interview Summary for U.S. Appl. No. 13/026,144 (Mar. 4, 2013).
Notice of Allowance and Fee(s) Due for U.S. Appl. No. 13/025,968 (Feb. 27, 2013).
Notice of Allowance and Fee(s) Due for U.S. Appl. No. 13/026,031 (Jan. 30, 2013).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742901.9 (Nov. 21, 2012).

* cited by examiner

METHODS, SYSTEMS, AND COMPUTER READABLE MEDIA FOR DIAMETER APPLICATION LOOP PREVENTION

PRIORITY CLAIM

This application claims the benefit of U.S. Provisional Patent Application Ser. No. 61/304,310 filed Feb. 12, 2010; the disclosure of which is incorporated herein by reference in its entirety.

TECHNICAL FIELD

The disclosures of each of the following commonly-owned, co-pending U.S. patent applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026, 105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144); and "Methods, Systems, And Computer Readable Media For Diameter Network Management," (Ser. No. 13/026,153).

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be sent to Diameter applications (e.g., software executed by a processor) to access or invoke various services. For example, a Diameter request message may be used for accessing Internet resources through a packet data network (PDN) gateway. The Diameter request message may require Diameter application processing, such as authentication or other processing, prior to reaching its destination. While it may be necessary to provide the Diameter message to a Diameter application for processing before providing the Diameter message to its destination, various problems can arise if transport nodes are not aware of whether Diameter application processing has been performed for the Diameter message. For example, a Diameter message may be caught in a Diameter application loop such that the message is repeatedly provided to an external Diameter application without ever being provided to a destination included in the message.

Accordingly, there exists a need for methods, systems, and computer readable media for Diameter application loop prevention.

SUMMARY

According to one aspect, the subject matter described herein includes a method for providing Diameter application loop prevention. The method includes steps occurring at a first Diameter node. The method further includes receiving a first Diameter message that is to be sent to a destination. The method also includes determining whether the first Diameter message requires processing by a Diameter application. The method includes, in response to determining that the first Diameter message requires processing by the Diameter application, determining whether the first Diameter message has been processed by the Diameter application. The method further includes, in response to determining that the first Diameter message has been processed by the Diameter application, preventing the first Diameter message from being sent to the Diameter application for processing.

According to another aspect, the subject matter described herein includes a system for providing Diameter application loop prevention. The system includes a first Diameter node. The first Diameter node includes a communications interface for receiving a first Diameter message that is to be sent to a destination. The first Diameter node also includes a screening module for determining whether the first Diameter message requires processing by a Diameter application, for, in response to determining that the first Diameter message requires processing by the Diameter application, determining whether the first Diameter message has been processed by the Diameter application, and for, in response to determining that the first Diameter message has been processed by the Diameter application, preventing the first Diameter message from being sent to the Diameter application for processing.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

As used herein, the term "Diameter application" refers to software in combination with hardware (such as a processor) and/or firmware for implementing or using a Diameter protocol. For example, a Diameter application may be software executed by a processor for performing home subscriber server (HSS) functions, such as subscriber authentication.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
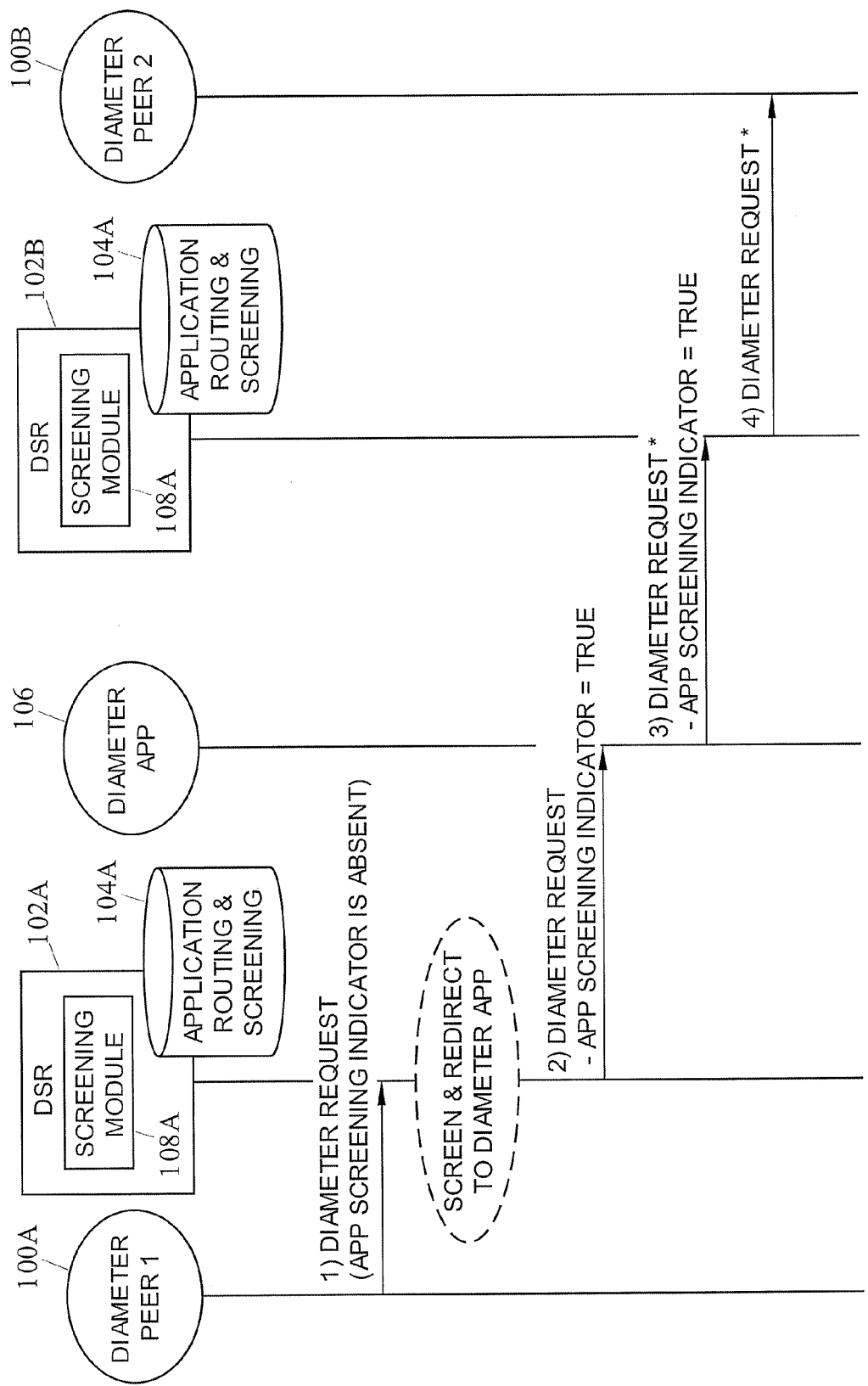
FIG. 1 is a signaling message flow diagram illustrating application loop prevention involving two Diameter signaling routers according to an embodiment of the subject matter described herein.

FIG. 1 is a signaling message flow diagram illustrating application loop prevention involving two Diameter signaling routers according to an embodiment of the subject matter described herein. In the embodiment illustrated in FIG. 1, various Diameter nodes, such as Diameter peer nodes 100A-B and Diameter signaling routers (DSRs) 102A-B, are depicted. Diameter nodes may be nodes capable of implementing or using a Diameter protocol. For example, a Diameter node may comprise a mobility management entity (MME), a home subscriber server (HSS) and/or authentication, authorization, and accounting (AAA) server, a Bearer Binding and Event Reporting Function (BBERF), a policy and charging enforcement function (PCEF), a policy and charging rules function (PCRF), a subscriber profile repository (SPR), a serving gateway (SGW), a packet data network gateway (PDN GW), a Diameter peer node, a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, a computing platform, or a DSR.

Referring to FIG. 1, Diameter peer node 100A and Diameter peer node 100B may be Diameter nodes configured for communicating messages. For example, a transport connection may be established between Diameter peer node 100A and Diameter peer node 100B for communicating Diameter messages. DSRs 102A-B may be any suitable entities for routing or relaying Diameter signaling messages between Diameter nodes. For example, DSR 102A may be an LTE signaling router, an LTE Diameter signaling router, a Diameter signaling agent, a Diameter proxy agent, a Diameter relay agent, a Diameter routing agent, a Diameter translation agent, or a Diameter redirect agent. DSRs 102A-B may include functionality for processing various messages and may include various communications interfaces for communication with Diameter nodes, e.g., 3rd Generation Partnership Project (3GPP) LTE communications interfaces and other (e.g., non-LTE) communications interfaces. DSRs 102A-B may include one or more processors for performing various functions, e.g., one or more message processors. In one embodiment, DSR related functionality, including the subject matter described herein, may be included in one or more modules (e.g., a screening module and a routing module).

Diameter applications 106 may be software in combination with hardware (such as a processor) and/or firmware for implementing or using a Diameter protocol. For example, a Diameter application 106 may include a pre-paid service application, number portability service application, location portability service application, usage measurements service application, authentication application, billing service application, advanced/intelligent routing service applications, messaging service applications (e.g., short message service, multimedia message service, instant message service, etc.), presence service, E.164 number mapping (ENUM) service, Diameter signaling message monitoring application, Diameter signaling message screening and filtering application, Diameter signaling message fraud detection and mitigation application, Diameter signaling message firewall/admission control application or other Diameter message-based network service application.

In one embodiment, Diameter applications 106 may receive and process a Diameter message before the Diameter message is relayed or routed (e.g., by a DSR 102 or Diameter application 106) to its intended destination (e.g., a Diameter peer node 100B). For example, a Diameter application 106 may receive a Diameter request message destined for Diameter peer node 100B. In this example, Diameter application 106 may perform subscriber authentication using information in the Diameter message before sending the Diameter request message or a corresponding message towards Diameter peer node 100B.

Some Diameter applications 106 may be integrated with or co-located at a DSR (e.g., DSR 102A) or a Diameter peer node (e.g., Diameter peer node 100B). Other Diameter applications 106 may be associated with distinct Diameter nodes, e.g., Diameter nodes external to DSRs 102A-B and Diameter peer nodes 100A-B. For example, a Diameter node executing Diameter application 106 may include a processor and one or more communications interfaces.

DSRs 102A-B and/or screening modules 108A-B may include functionality for providing Diameter application loop prevention. Diameter application loop prevention may include any actions for preventing a Diameter message from being needlessly (e.g., repeatedly) sent to a Diameter application for processing. For example, Diameter application loop prevention may include screening, marking, and/or indicating which Diameter messages require processing by a Diameter application 106 and have not yet been processed. In another example, Diameter application loop prevention may include screening, marking, and/or indicating Diameter messages which do not require processing by a Diameter application 106.

In one embodiment, each Diameter application 106 may be associated with a unique identifier (e.g., a fully qualified domain name (FQDN) or universal resource identifier (URI)). For example, Diameter applications 106 located at distinct nodes may be associated with public FQDNs and Diameter applications 106 co-located at a DSR 102 may be associated with private FQDNs. The unique identifiers may be used to identify whether a particular Diameter application 106 has processed a Diameter message. For example, a Diameter route record AVP in a Diameter request message may be used for this purpose. That is, before being relayed or routed from a Diameter application 106, a Diameter application 106 may modify a Diameter route record AVP to include its own unique identifier (e.g., FQDN) thereby indicating the Diameter request has been processed by Diameter application 106.

DSRs 102A-B and/or screening modules 108A-B may include or have access to one or more databases, such as application routing and screening (ARS) databases 104A-B. ARS databases 104A-B may include any suitable data structure for storing or maintaining information usable for routing or relay Diameter messages to Diameter application 106 and/or information for screening Diameter messages. For example, ARS databases 104A-B may include screening policies and/or rules for examining Diameter messages (e.g., header portions of a Diameter message) for determining whether Diameter message requires Diameter application processing. In this example, screening rules may be used to determine whether information in a Diameter message (e.g., an AVP value or lack thereof) indicates that the Diameter message requires processing by Diameter application 106. In one embodiment, ARS databases 104A-B may include information usable for providing Diameter application loop prevention, e.g., Diameter application status information associated with Diameter messages, Diameter sessions, and/or associated subscribers.

Referring to the embodiment shown in FIG. 1, DSR 102A, including screening module 108A, and DSR 102B, including screening module 108B, may be intermediate nodes for communications between Diameter peer node 100A and Diameter peer node 100B. DSRs 102A-B may be configured to screen Diameter messages and redirect the Diameter messages that require Diameter application processing to Diameter application 106.

At step 1, a Diameter request message may be sent from Diameter peer node 100A addressed to Diameter peer node 100B. DSR 102A may receive the Diameter message and may perform Diameter application screening. In one embodiment, Diameter application screening may include determining whether a received Diameter message requires processing by Diameter application 106 and/or determining whether a received Diameter message has been processed by Diameter application 106.

In one embodiment, determining whether a Diameter message has been processed by Diameter application 106 may include determining whether the Diameter message contains or lacks application status information or other associated information. For example, DSR 102A or screening module 108A may determine, using screening rules from ARS database 104A, that a Diameter message contains application status information.

Application status information may include various information associated with Diameter application screening and/or processing. For example, application status information may indicate whether a Diameter message should by processed by one or more Diameter applications 106. Application status information may also include an application screening indicator that indicates whether application screening has been performed. In another example, application status information may include an application processing indicator that indicates whether a Diameter message has been processed by Diameter application 106.

In one embodiment, an application screening indicator and/or an application processor indicator may be implemented using Boolean data types or parameters. For example, a "FALSE" or 0 value for an application screening indicator may indicate that screening has not been performed and a "TRUE" or 1 value for an application screening indicator may indicate that screening has been performed.

In one embodiment, lack of application status information, or portions thereof, in a Diameter message may indicate that particular actions should be performed. For example, as illustrated in FIG. 1, DSR 102A may receive a Diameter request message that does not include an application screening indicator. DSR 102A may examine the received Diameter request message and determine that application screening has not been performed. In response, DSR 102A may perform application screening to determine whether the received Diameter message requires processing by Diameter application 106 and whether the received Diameter message has not been processed by Diameter application 106.

In one embodiment, in response to determining that the received Diameter message requires processing by Diameter application 106 and that the received Diameter message has not been processed by Diameter application 106, a received Diameter message may be modified to include application status information. For example, in response to determining that the received Diameter message does not contain application status information, a Diameter AVP containing an application screening parameter and an associated value may be included in the Diameter message and may be provided to Diameter application 106 for processing.

In another embodiment, in response to determining that the received Diameter message requires processing by Diameter application 106 and that the received Diameter message has not been processed by Diameter application 106, a Diameter message may be generated. The new Diameter message may include application status information and various portions of the received Diameter message.

At step 2, a Diameter request message that includes an application screening indicator may be sent or redirected from DSR 102A to Diameter application 106. In one embodiment, the application screening indicator may indicate whether the Diameter message has been screened by screening module 108A and/or may indicate whether the Diameter message should be processed by Diameter application 106. In the embodiment illustrated in FIG. 1, the application screening indicator is a "TRUE" value indicating that screening has been performed and that the Diameter message requires processing by Diameter application 106.

Diameter application 106 may receive the Diameter message and may process the Diameter message. Diameter application processing may include performing one or more functions. For example, using subscriber identifying information found in a header portion of a received Diameter message, Diameter application 106 may perform credit control functions (e.g., pre-paid service authorization) for determining whether a subscriber is authorized (e.g., has enough credits) to request services.

In one embodiment, processing may include modifying a Diameter message. For example, after determining that a subscriber is authorized to request services, a Diameter message may be modified to include application information. Application information may include information associated with Diameter application processing, such as information indicating that the Diameter request message has been processed. In another example, a Diameter request message processed by a Diameter application 106 may be modified to include a Diameter route record AVP or to modify an existing Diameter route record AVP. The route record AVP may include an identifier (e.g., a fully qualified domain name (FQDN) or universal resource identifier (URI)) for identifying Diameter application 106 that has processed the Diameter request message.

In one embodiment, processing may include generating a new Diameter message based on a received Diameter message. For example, a Diameter message may be generated. The new Diameter message may include application information along with various portions (e.g., application status information) of the received Diameter message. In yet another example, a modified Diameter message or a new Diameter message may lack application status information, or a portion thereof.

In one embodiment, processing may include sending a modified Diameter message or a generated Diameter message to another location (e.g., a second Diameter application 106, DSR 102A, DSR 102B, Diameter peer node 100A, or Diameter peer node 100B). For example, a modified Diameter message that includes application information and application status information may be sent towards DSR 102B. In another example, a new Diameter message that includes application information and application status information may be sent to Diameter 100B.

At step 3, after performing one or more functions, a Diameter request message that includes an application screening indicator and application information may be sent from Diameter application 106 to DSR 102B. DSR 102B and/or screening module 108B may receive the Diameter message and may perform Diameter application screening. For example, screening module 108B may examine a Diameter message and may determine that the Diameter message has been processed by Diameter application 106.

In one embodiment, DSR 102B and/or screening module 108B may determine that Diameter application loop prevention should be performed. For example, DSR 102B may receive a Diameter request message and examine a Diameter route record AVP in the Diameter request message. The Diameter route record AVP may include an identifier associated with a Diameter application 106 and, as such, may indicate that the Diameter message has been processed by Diameter application 106. In response to determining that the Diameter message has been processed by Diameter application 106, screening module 108B may prevent the Diameter message from being sent to Diameter application 106.

After determining that a Diameter message has been processed by Diameter application 106, DSR 102B and/or screening module 108B may perform various functions. In one embodiment, DSR 102B and/or screening module 108B may modify a Diameter message and/or generate a new Diameter message for delivery to a destination, e.g., Diameter peer node 100B. For example, the received Diameter message may be modified to include or remove an application screening indicator and/or application information. In another example, a Diameter message may be generated. The new Diameter message may include or lack various portions (e.g., application status information and/or application information) of the received Diameter message.

At step 4, a Diameter request message may be sent from DSR 102B to Diameter peer node 100B. The Diameter message may lack application status information (e.g., an application screening indicator). Diameter peer node 100B may receive the Diameter message, process the Diameter message, and send a Diameter answer message towards Diameter peer node 100A. For example, Diameter peer node 100B may receive a Diameter request message for services. Diameter peer node 100B may process the request and determine whether the services can be provided. Diameter peer node 100B may send a Diameter answer message indicating whether the requested services can be provided.

Figure 2:
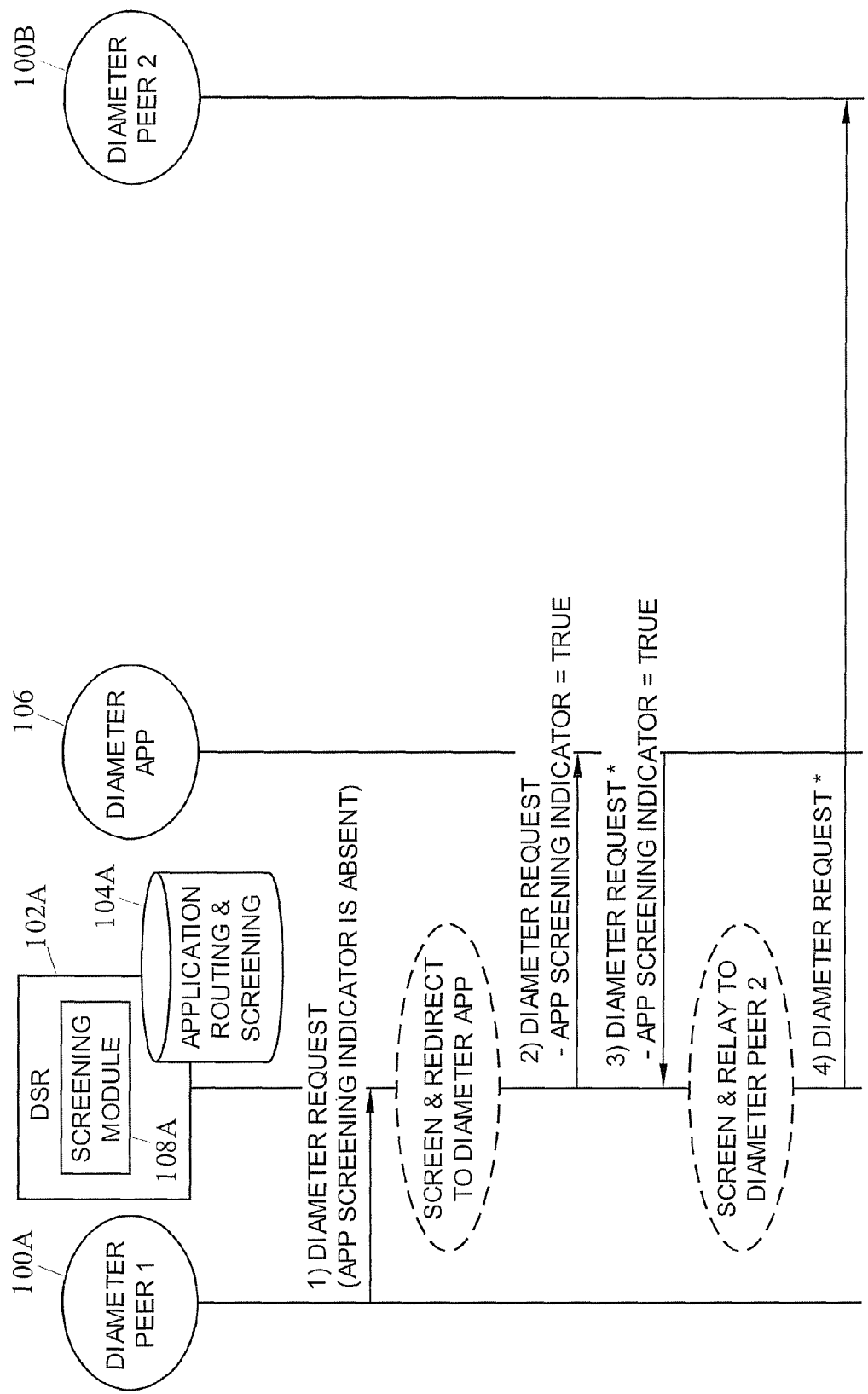
FIG. 2 is a signaling message flow diagram illustrating application loop prevention involving a Diameter signaling router according to an embodiment of the subject matter described herein.

FIG. 2 is a signaling message flow diagram illustrating application loop prevention involving a Diameter signaling router according to an embodiment of the subject matter described herein. Except as disclosed herein, the nodes of FIG. 2 are essentially the same as the nodes described in reference to FIG. 1. Further, steps 1-2 of FIG. 2 are essentially the same as described in reference to steps 1-2 of FIG. 1.

In this embodiment, DSR 102A, including screening module 108A, may be used for relaying or routing communications between Diameter peer node 100A and Diameter peer node 100B. For example, DSR 102A may screen and provide a Diameter message that requires processing to Diameter application 106. After processing the Diameter message, Diameter application 106 may provide the Diameter message or a related Diameter message back to DSR 102A for relaying or routing to Diameter peer node 100B.

Referring to FIG. 2, at step 3, after performing one or more functions, a Diameter request message that includes an application screening indicator and application information may be sent from Diameter application 106 to DSR 102A. DSR 102A and/or screening module 108A may receive the Diameter message and may perform Diameter application screening.

In one embodiment, DSR 102A and/or screening module 108A may determine that Diameter application loop prevention should be performed. For example, in response to determining that a Diameter message has been processed by Diameter application 106, screening module 108A may prevent the Diameter message from being sent to Diameter application 106.

Diameter application 106 may also modify a Diameter message and/or generate a new Diameter message for delivery to a second destination, e.g., Diameter peer node 100B. For example, the Diameter message may be modified to include or remove application status information and/or application information. In another example, a Diameter message may be generated. The new Diameter message may include or lack various portions of the received Diameter message.

At step 4, a Diameter request message may be sent from DSR 102A to Diameter peer node 100B. The Diameter message may lack application status information (e.g., an application screening indicator). Diameter peer node 100B may receive the Diameter message, process the Diameter message, and send a Diameter answer message towards Diameter peer node 100A. For example, Diameter peer node 100B may receive a Diameter request message for services. Diameter peer node 100B may process the request and determine whether the services can be provided. Diameter peer node 100B may send a Diameter answer message indicating that services can be provided.

Figure 3:
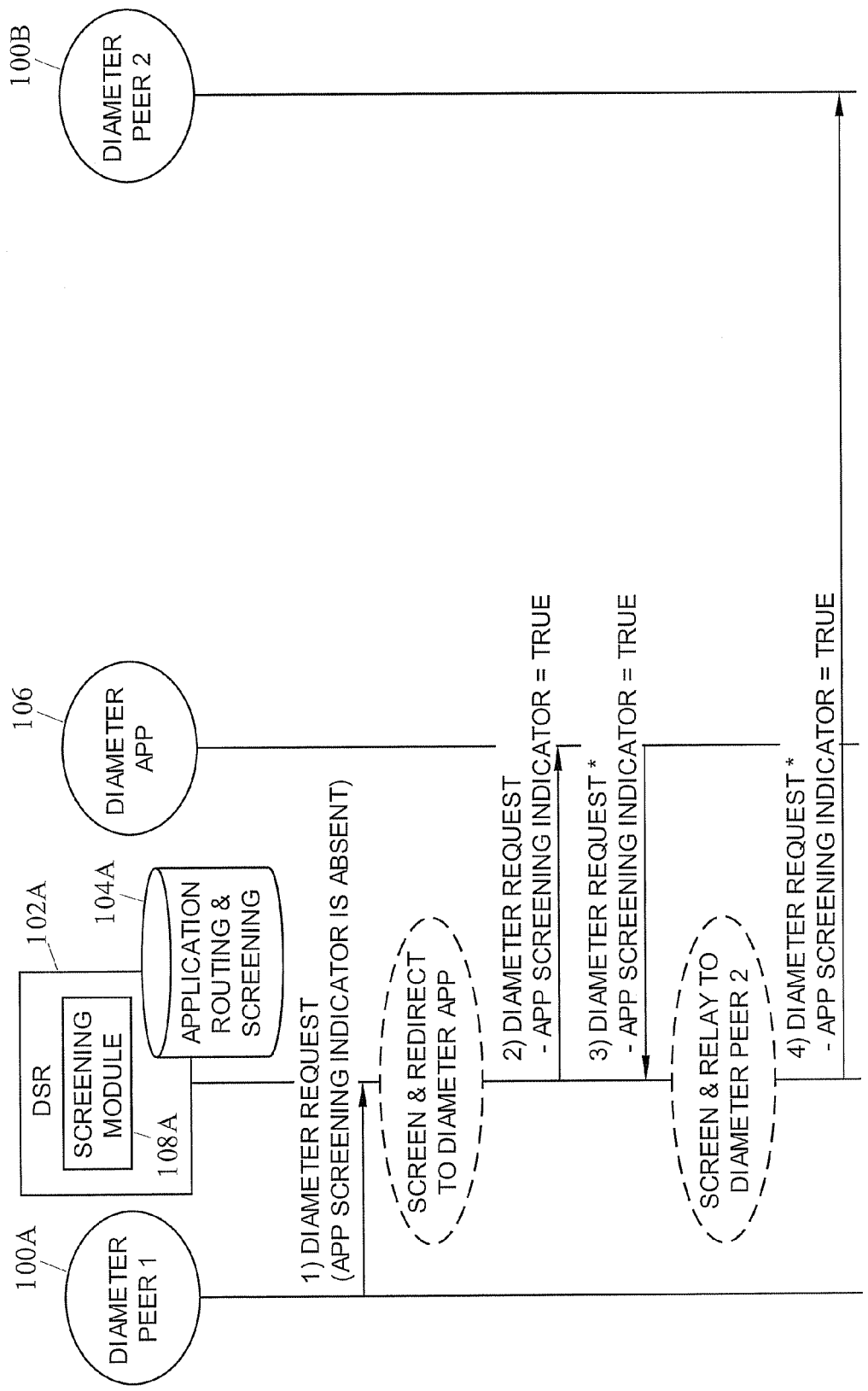
FIG. 3 is a signaling message flow diagram illustrating application loop prevention involving a Diameter signaling router according to another embodiment of the subject matter described herein.

FIG. 3 is a signaling message flow diagram illustrating application loop prevention involving a Diameter signaling router according to another embodiment of the subject matter described herein. Except as disclosed herein, the nodes of FIG. 3 are essentially the same as the nodes described in reference to FIGS. 1-2. Further, steps 1-2 of FIG. 3 are essentially the same as described in reference to steps 1-2 of FIG. 1.

In this embodiment, DSR 102A, including screening module 108A, may be used for relaying or routing communications between Diameter peer node 100A and Diameter peer node 100B. For example, DSR 102A may screen and provide a Diameter message that requires processing to Diameter application 106. After processing the Diameter message, Diameter application 106 may provide the Diameter message or a related Diameter message back to DSR 102A.

Referring to FIG. 3, at step 3, after performing one or more functions, a Diameter request message that includes an application screening indicator and application information may be sent from Diameter application 106 to DSR 102A. DSR 102A and/or screening module 108A may receive the Diameter message and may perform Diameter application screening.

In one embodiment, DSR 102A and/or screening module 108A may determine that Diameter application loop prevention should be performed. For example, in response to determining that a Diameter message has been processed by Diameter application 106, screening module 108A may prevent the Diameter message from being sent to Diameter application 106.

Diameter application 106 may also provide the Diameter message or a related Diameter message to a second destination, e.g., Diameter peer node 100B or a second Diameter application 106. For example, Diameter application 106 may provide a copy of the Diameter message sent to DSR 102A to another destination. In this example, the recipient Diameter node or Diameter application 106 may be configured to further process the received Diameter message.

At step 4, a Diameter request message that includes an application screening indicator and application information may be sent from DSR 102A to Diameter peer node 100B. Diameter peer node 100B may receive the Diameter message, process the Diameter message, and send a Diameter answer message towards Diameter peer node 100A. In one embodiment, processing the Diameter message may include determining that the Diameter message has been processed by Diameter application 106 and that additional processing can be performed. After processing the Diameter message, an appropriate Diameter answer message may be sent to Diameter peer node 100A.

Figure 4:
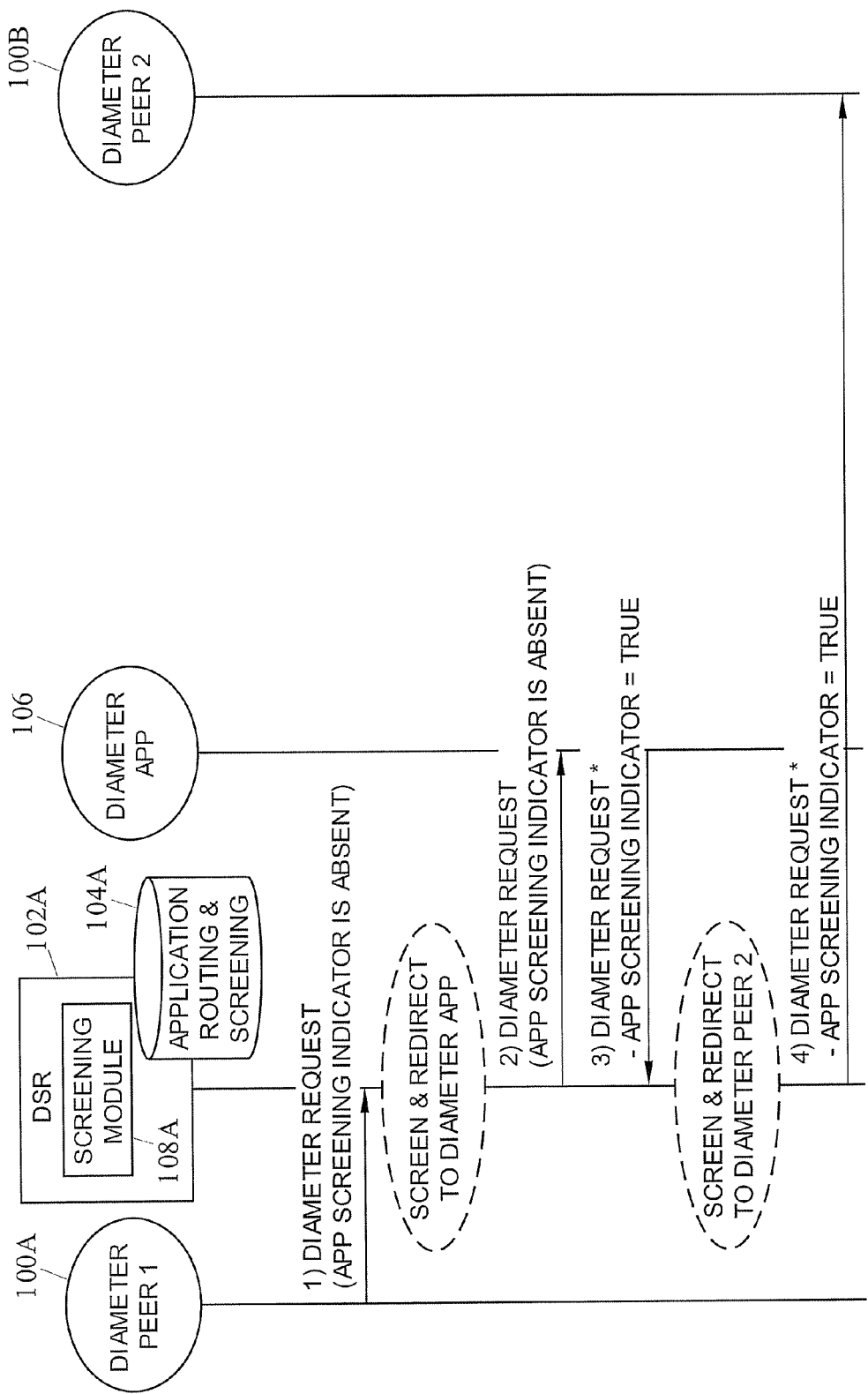
FIG. 4 is a signaling message flow diagram illustrating application loop prevention involving a Diameter signaling router according to yet another embodiment of the subject matter described herein.

FIG. 4 is a signaling message flow diagram illustrating application loop prevention involving a Diameter signaling router according to yet another embodiment of the subject matter described herein. Except as disclosed herein, the nodes of FIG. 4 are essentially the same as the nodes described in reference to FIGS. 1-2.

In this embodiment, DSR 102A, including screening module 108A, may be used for relaying or routing communications between Diameter peer node 100A and Diameter peer node 100B. For example, DSR 102A may screen and provide a Diameter message that requires processing to Diameter application 106. After processing the Diameter message, Diameter application 106 may provide the Diameter message or a related Diameter message back to DSR 102A.

Referring to FIG. 4, at step 1, a Diameter request message may be sent from Diameter peer node 100A addressed to Diameter peer node 100B. DSR 102A may receive the Diameter message and may perform Diameter application screening. In one embodiment, screening may include determining whether a received Diameter message requires processing by Diameter application 106 and/or determining whether a received Diameter message has been processed by Diameter application 106.

In response to determining that the received Diameter message requires processing by Diameter application 106 and that the received Diameter message has not been processed by Diameter application 106, the Diameter message or a related Diameter message may be provided to Diameter application 106 for processing.

At step 2, a Diameter request message may be sent from DSR 102A to Diameter application 106. Diameter application 106 may receive the Diameter message and may process the Diameter message. Diameter application processing may include performing one or more functions. For example, using subscriber identifying information found in a header portion of a received Diameter message, Diameter application 106 may perform credit control functions (e.g., pre-paid service authorization) for determining whether a subscriber is authorized (e.g., has enough credits) to request services.

In one embodiment, processing may include modifying a Diameter message and/or generating a new Diameter message. For example, after determining that a subscriber is authorized to request services, a Diameter message may be modified to include an authorization AVP that includes application information. The application information may include information associated with Diameter application processing, such as information indicating that the Diameter request message is authorized. In another example, a Diameter message may be generated. The new Diameter message may include application information along with various portions of the received Diameter message.

In this embodiment, Diameter application 106 may be configured for modifying a received Diameter message to include application status information. For example, in response to determining that the received Diameter message does not contain application status information, Diameter application 106 may include an AVP containing an application screening parameter and an associated value may be included in the Diameter message. In another embodiment, Diameter application 106 may be configured for generating a Diameter message that includes application status information associated with a received Diameter message. The new Diameter message may include various portions of the received Diameter message.

In one embodiment, processing may include sending a modified Diameter message or a generated Diameter message to another location (e.g., a second Diameter application 106, DSR 102A, DSR 102B, Diameter peer node 100A, or Diameter peer node 100B). For example, a modified Diameter message that includes application information and application status information may be sent towards DSR 102B. In another example, a new Diameter message that includes application information and application status information may be sent to Diameter 100B.

At step 3, after performing one or more functions associated with the Diameter request message of step 2, a Diameter request message that includes an application screening indicator and application information may be sent from Diameter application 106 to DSR 102A. DSR 102A and/or screening module 108A may receive the Diameter message and may perform Diameter application screening.

In one embodiment, DSR 102A and/or screening module 108A may determine that Diameter application loop prevention should be performed. For example, in response to determining that a Diameter message has been processed by Diameter application 106, screening module 108A may prevent the Diameter message from being sent to Diameter application 106.

After determining that a Diameter message has been processed by Diameter application 106, DSR 102A may perform various functions. In one embodiment, DSR 102B and/or screening module 108B may copy or modify a Diameter message and/or may generate a new Diameter message for delivery to a destination, e.g., Diameter peer node 100B. For example, the received Diameter message may be modified to include or remove an application screening indicator and/or application information. In another example, a Diameter message may be generated. The new Diameter message may include or lack various portions (e.g., application status information and/or application information) of the received Diameter message. In yet another example, the Diameter message for delivery to a destination may be a copy of the message received by DSR 102A. DSR 102A may use relay or routing functionality to send the Diameter message including an application screening indicator and application information to Diameter peer node 100B.

At step 4, a Diameter request message that includes an application screening indicator and application information may be sent from DSR 102A to Diameter peer node 100B. Diameter peer node 100B may receive the Diameter message, process the Diameter message, and send a Diameter answer message towards Diameter peer node 100A. In one embodiment, processing the Diameter message may include determining that the Diameter message has been processed by a Diameter application and that additional processing can continue. After processing the Diameter message, an appropriate Diameter answer message may be sent to Diameter peer node 100A.

While the above embodiment describes a Diameter message associated with a single Diameter application 106, it will be appreciated that a Diameter message may be associated with multiple Diameter applications 106. In such an embodiment, a given Diameter message may be redirected by a DSR (e.g., DSR 102A or DSR 102B) or another node (e.g., a Diameter application 106) to each associated Diameter applications 106.

Figure 5:
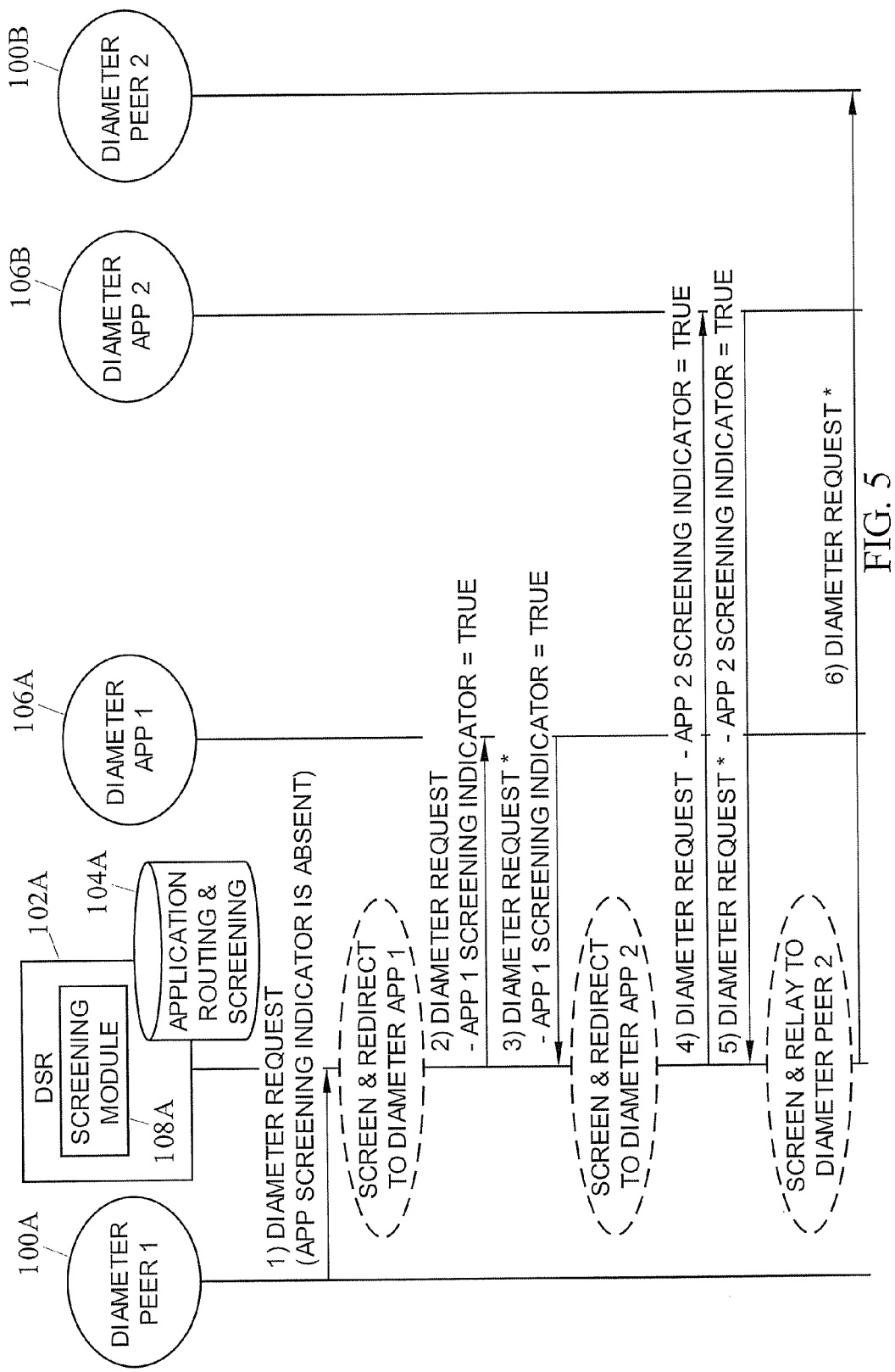
FIG. 5 is a signaling message flow diagram illustrating application loop prevention involving two Diameter applications according to an embodiment of the subject matter described herein.

FIG. 5 is a signaling message flow diagram illustrating application loop prevention involving two Diameter applications according to an embodiment of the subject matter described herein. Except as disclosed herein, the nodes of FIG. 5 are essentially the same as the nodes described in reference to FIG. 1. Further, steps 1-3 of FIG. 5 are essentially the same as described in reference to steps 1-3 of FIG. 2.

In this embodiment, DSR 102A may receive a Diameter request message that is associated with a first Diameter application 106A and a second Diameter application 106B. DSR 102A may screen the Diameter request. Based on screening rules and/or other factors, DSR 102A may determine a particular order for Diameter application processing associated with the Diameter request. DSR 102A may include application status information (e.g., an application screening indicator) for first Diameter application 106A and may redirect the Diameter request message to first Diameter application 106A. After processing the Diameter request message, the first Diameter application 106A may include an indicator indicating that the Diameter request message has been processed by first Diameter application 106A, e.g., adding a FQDN in a Diameter route record AVP. The Diameter request message may be sent back to DSR 102A.

Referring to FIG. 5, after performing one or more functions, a Diameter request message that includes an application screening indicator and application information (e.g., Diameter route record AVP information) may be sent from first Diameter application 106A to DSR 102A. DSR 102A and/or screening module 108A may receive the Diameter message and may perform Diameter application screening. DSR 102A and/or screening module 108A may determine that first Diameter application 106A has processed the Diameter request message.

In one embodiment, DSR 102A and/or screening module 108A may determine that Diameter application loop prevention should be performed. For example, in response to determining that a Diameter message has been processed by first Diameter application 106A, screening module 108A may prevent the Diameter message from being sent to first Diameter application 106A.

DSR 102 may determine that second Diameter application 106B should process the Diameter request message and may redirect the Diameter request message or a similar message to second Diameter application 106B for processing. For example, the Diameter message may be modified to include or remove application status information and/or application information. For instance, the Diameter message may be modified to include application status information associated with second Diameter application 106B. In another instance, application status information associated with second Diameter application 106B may be in addition to application status information associated with first Diameter application 106A. In yet another instance, a Diameter message may be generated. The new Diameter message may include or lack various portions of the received Diameter message.

At step 4, a Diameter request message may be sent from DSR 102A to second Diameter application 106B. Diameter application 106B may receive the Diameter message and may process the Diameter message. Diameter application 106B may include an indicator indicating that the Diameter request message has been processed by first Diameter application 106B, e.g., adding a FQDN in a Diameter route record AVP.

At step 5, after performing one or more functions associated with the Diameter request message of step 4, a Diameter request message that includes an application screening indicator and application information may be sent from second Diameter application 106B to DSR 102A. DSR 102A and/or screening module 108A may receive the Diameter message and may perform Diameter application screening. DSR 102A and/or screening module 108A may determine that the first Diameter application has processed the Diameter request message.

In one embodiment, DSR 102A and/or screening module 108A may determine that Diameter application loop prevention should be performed. For example, in response to determining that a Diameter message has been processed by second Diameter application 106B, screening module 108A may prevent the Diameter message from being sent to second Diameter application 106B.

At step 6, after determining that Diameter application processing is complete for a Diameter request message (e.g., determining that all associated Diameter applications 106 have processed the Diameter request message), the Diameter request message may be sent from DSR 102A to Diameter peer node 100B. The Diameter message may lack application status information (e.g., an application screening indicator). Diameter peer node 100B may receive the Diameter message, process the Diameter message, and send a Diameter answer message towards Diameter peer node 100A. For example, Diameter peer node 100B may receive a Diameter request message for services. Diameter peer node 100B may process the request and determine whether the services can be provided. Diameter peer node 100B may send a Diameter answer message indicating that services can be provided.

Figure 6:
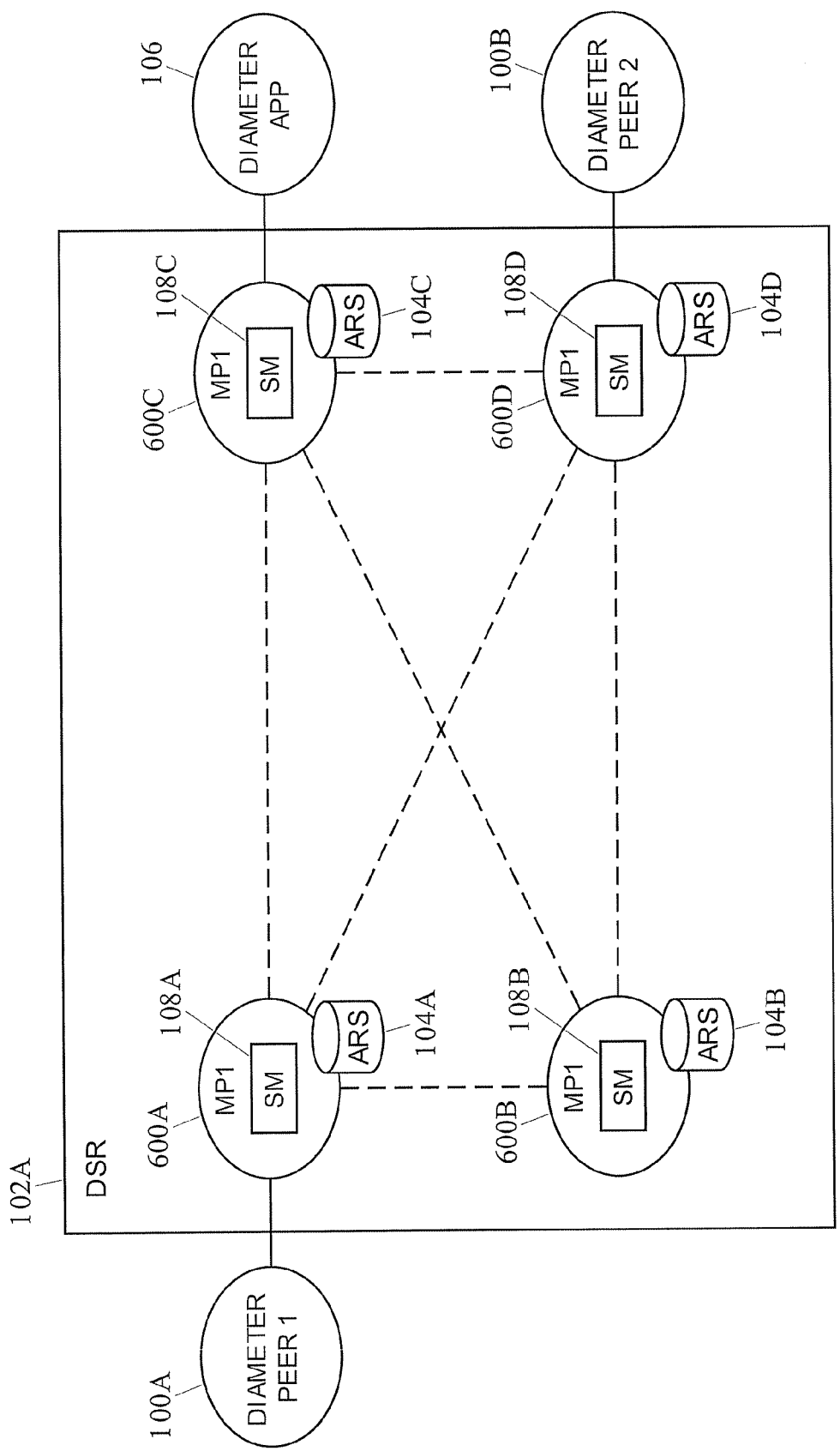
FIG. 6 is a block diagram illustrating an exemplary Diameter signaling router for application loop prevention according to an embodiment of the subject matter described herein.

FIG. 6 is block diagram illustrating an exemplary DSR 102 for providing Diameter application loop prevention according to an embodiment of the subject matter described herein.

Referring to the embodiment illustrated in FIG. 6, DSR 102 includes one or more message processors (MPs) 600A-D for sending, receiving, and/or processing various messages, such as Diameter messages. MPs 600A-D may include one or more communications interfaces for communicating signaling messages (e.g., Diameter messages) and/or inter-MP messages. For example, MPs 600A-D may send and receive Diameter request messages between external entities, e.g., Diameter peer node 100A and Diameter peer node 100B. MPs 600A-D may also send and receive messages (e.g., Diameter messages and other non-Diameter messages) between internal entities. For example, MP 600A may screen a Diameter message and relay it to MP 600C for further processing.

MPs 600A-D may include or have access to one or more screening modules, e.g., screening modules 108A-D. Screening module 108A-D may include any functionality described herein associated with Diameter application loop prevention, such as application loop screening, message redirection, routing, and relaying. In one embodiment, MPs 600A-D and screening modules 108A-D may include functionality for handling particular messages. For example, screening module 108C at MP 600C may handle communications with Diameter application 106 and screening module 108D at MP 600D may handle communications with Diameter peer node 100B.

MPs 600A-D and/or screening modules 108A-B may include or have access to one or more databases, such as application routing and screening (ARS) databases 104A-D. ARS databases 104A-D may include any suitable data structure for storing or maintaining information usable for routing or relay Diameter messages to Diameter application 106 and/or information for screening Diameter messages. For example, ARS databases 104A-B may include screening policies and/or rules for examining Diameter messages (e.g., header portions of a Diameter message) for determining whether Diameter message requires Diameter application processing.

In one embodiment where a DSR 102 includes multiple processors (e.g., a distributed architecture), each processor (e.g., an MP 600) may be capable of performing Diameter application loop prevention for a Diameter message, e.g., regardless of which processor performed Diameter application screening, redirection, or other processing of the Diameter message or a related message. For example, MP 600C may send a Diameter request message to Diameter application 106. A processed Diameter request message may be sent by Diameter application 106 to DSR 102. The corresponding Diameter response message may be received at MP 600D. MP 600D and/or screening module 108D may screen the received Diameter message and determine that Diameter application 106 has already processed the Diameter message. For example, screening module 108D may examine a Diameter route record AVP in the received Diameter message. The Diameter route record AVP may include an identifier associated with a Diameter application 106 and, as such, may indicate that the Diameter message has been processed by Diameter application 106. MP 600D and/or screening module 108D may perform Diameter application loop prevention so that the Diameter message is not forwarded back to Diameter application 106.

Figure 7:
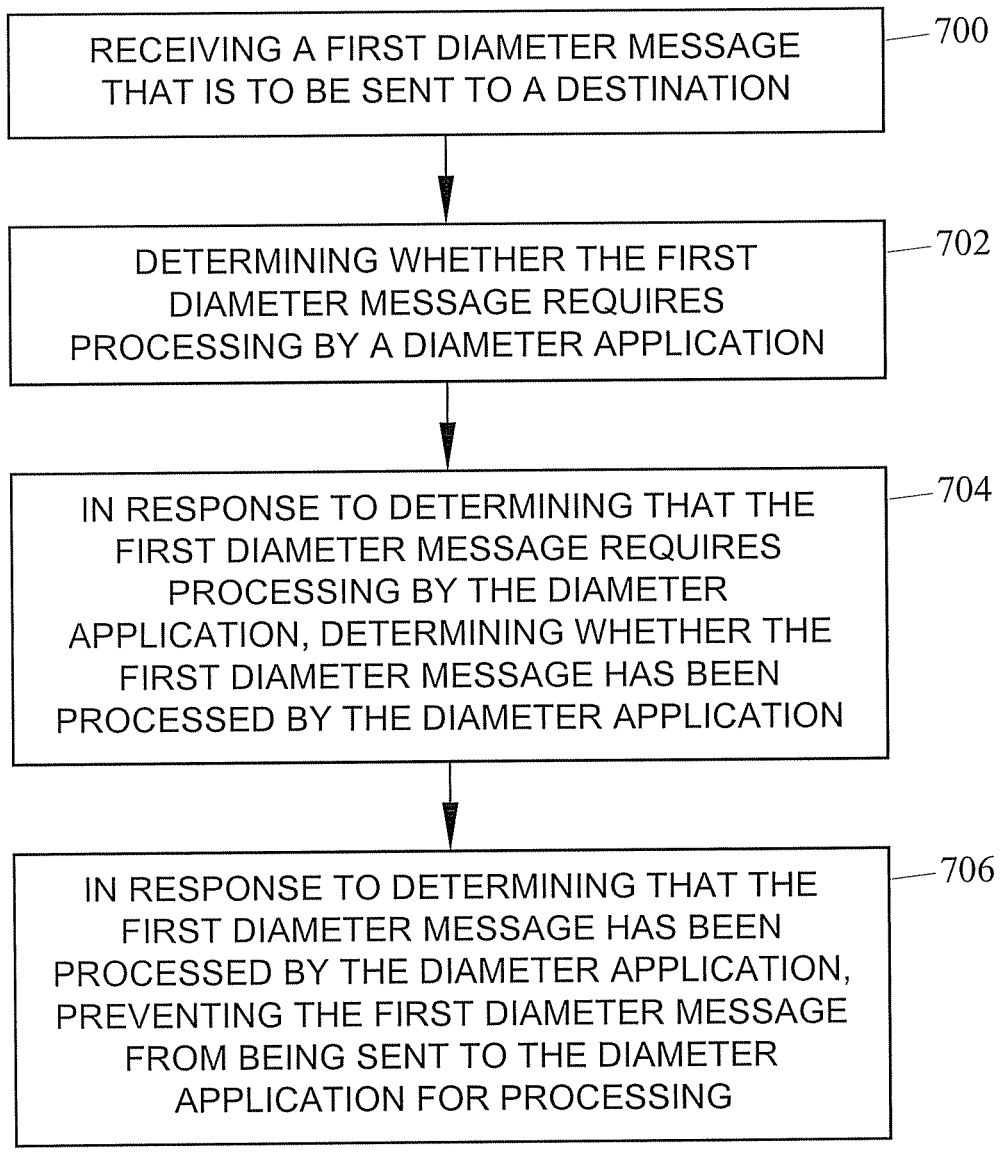
FIG. 7 is a flow chart illustrating exemplary steps for providing Diameter application loop prevention according to an embodiment of the subject matter described herein.

FIG. 7 is a flow chart illustrating exemplary steps for providing Diameter application loop prevention according to an embodiment of the subject matter described herein. In one embodiment, one or more exemplary steps described herein may be performed at or performed by a DSR 102. In another embodiment, one or more exemplary steps described herein may be performed at or performed by a screening module 108 located at various Diameter nodes, e.g., Diameter peer node 100A, Diameter application 106, and Diameter peer node 100B. In yet another embodiment, one or more exemplary steps described herein may be performed at or performed by one or more processors (e.g., message processors 600A-D) in a DSR 102.

Referring to the embodiment illustrated in FIG. 7, at step 700, a first Diameter message that is to be sent to a destination may be received. For example, DSR 102A may receive a Diameter signaling message from Diameter peer node 100A via a communications interface. The received Diameter signaling message may be intended for Diameter peer node 100B.

At step 702, it may be determined whether the first Diameter message requires processing by a Diameter application. Continuing from the example stated above, DSR 102A and/or screening module 108A may screen the Diameter message for determining whether the Diameter message requires processing by Diameter application 106.

At step 704, in response to determining that the first Diameter message requires processing by the Diameter application, it may be determined whether the first Diameter message has been processed by the Diameter application. Continuing from the example stated above, DSR 102A may examine the Diameter message for application status information, e.g., an application screening indicator. The application status information may include information for determining or indicating whether the Diameter message has been screened and/or processed by Diameter application 106.

In one embodiment, application status information and application information may each include attribute value pair (AVP) information, parameter information, value information, message header information, or message payload information.

At step 706, in response to determining that the first Diameter message has been processed by the Diameter application, the first Diameter message may be prevented from being sent to the Diameter application for processing. By preventing the Diameter message from being re-sent to the Diameter application, application loops may be prevented. In one embodiment, in response to determining that the first Diameter message has been processed by the Diameter application, the first Diameter message may be sent to a destination, e.g., Diameter peer node 100B.

While various application loop prevention functionality is disclosed above in relation to particular DSRs 102 (e.g., DSR 102A and DSR 102B), it will be understood that such functionality is illustrative and that a given DSR 102 or other appropriate Diameter node may include similar, different, and/or additional functionality.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing Diameter application loop prevention, the method comprising:
at a first Diameter node:
receiving a first Diameter message that is to be sent to a destination;
determining whether the first Diameter message requires processing by a Diameter application, wherein determining whether the first Diameter message has been processed by the Diameter application includes determining whether the first Diameter message contains application status information, wherein the application status information includes a Diameter attribute value pair (AVP) and wherein the Diameter AVP includes a unique identifier for identifying the Diameter application;
in response to determining that the first Diameter message requires processing by the Diameter application, determining whether the first Diameter message has been processed by the Diameter application; and
in response to determining that the first Diameter message has been processed by the Diameter application, preventing the first Diameter message from being sent to the Diameter application for processing.

2. The method of claim 1 comprising:
determining whether the first Diameter message requires processing by a second Diameter application;
in response to determining that the first Diameter message requires processing by the second Diameter application, determining whether the first Diameter message has been processed by the second Diameter application; and
in response to determining that the first Diameter message has been processed by the second Diameter application, preventing the first Diameter message from being sent to the second Diameter application for processing.

3. The method of claim 1 comprising:
routing the first Diameter message to the destination.

4. The method of claim 1 wherein the first Diameter node is a Diameter signaling router (DSR) and wherein the DSR includes multiple processors for performing Diameter application loop prevention.

5. The method of claim 1 wherein the application status information includes information for indicating that a Diameter message has been processed by a Diameter application.

6. The method of claim 1 wherein the Diameter AVP is a Diameter Route Record AVP and the unique identifier is a fully qualified domain name (FQDN).

7. The method of claim 1 wherein the Diameter AVP is a vendor specific AVP.

8. The method of claim 1 comprising, in response to determining that the first Diameter message does not contain the application status information, providing a second Diameter message to the application.

9. The method of claim 8 wherein the second Diameter message comprises a copy of the first Diameter message, the first Diameter message, a modified first Diameter message, the first Diameter message modified to include the application status information, a new Diameter message, a new Diameter message including information contained in the first Diameter message, or a new Diameter message including information contained in the first Diameter message and the application status information.

10. The method of claim 8 comprising:
at a second Diameter node executing the Diameter application:
receiving the second Diameter message; and
processing, by the Diameter application, the second Diameter message.

11. The method of claim 10 comprising, in response to processing the second Diameter message, sending a third Diameter message to the destination, a third Diameter node, or the first Diameter node.

12. The method of claim 11 wherein the third Diameter message comprises a copy of the second Diameter message, the second Diameter message, a modified second Diameter message, the second Diameter message modified to include application information, the second Diameter message modified to include application information and the application status information, the second Diameter message modified to include application information and lack the application status information, a new Diameter message, a new Diameter message including information contained in the second Diameter message, a new Diameter message including information contained in the second Diameter message and application information, a new Diameter message including information contained in the second Diameter message, application information, and the application status information, or a new Diameter message including information contained in the second Diameter message, application information, and lacking the application status information.

13. The method of claim 11 wherein the first, second, and third Diameter nodes and the destination each comprises a Diameter signaling router (DSR), a Diameter relay agent, a Diameter redirect agent, a Diameter translation agent, a Diameter proxy agent, a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a policy and charging enforcement function (PCEF), a policy and charging rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, or a computing platform.

14. The method of claim 12 wherein the application status information and the application information each include attribute value pair (AVP) information, parameter information, value information, message header information, or message payload information.

15. A system for providing Diameter application loop prevention, the system comprising:
a first Diameter node including:
a communications interface for receiving a first Diameter message that is to be sent to a destination; and
a screening module for determining whether the first Diameter message requires processing by a Diameter application, for, in response to determining that the first Diameter message requires processing by the Diameter application, determining whether the first Diameter message has been processed by the Diameter application, wherein determining whether the first Diameter message has been processed by the Diameter application includes determining whether the first Diameter message contains application status information, wherein the application status information includes a Diameter attribute value pair (AVP)

and wherein the Diameter AVP includes a unique identifier for identifying the Diameter application, and for, in response to determining that the first Diameter message has been processed by the Diameter application, preventing the first Diameter message from being sent to the Diameter application for processing.

16. The system of claim 15 wherein the first screening module is further configured for determining whether the first Diameter message requires processing by a second Diameter application, for, in response to determining that the first Diameter message requires processing by the second Diameter application, determining whether the first Diameter message has been processed by the second Diameter application, and for, in response to determining that the first Diameter message has been processed by the second Diameter application, preventing the first Diameter message from being sent to the second Diameter application for processing.

17. The system of claim 15 wherein the first Diameter node is a Diameter signaling router (DSR) and wherein the DSR includes multiple processors for performing Diameter application loop prevention.

18. The system of claim 15 wherein the first Diameter node is configured for sending the first Diameter message to the destination.

19. The system of claim 15 wherein application status information includes information for indicating whether a Diameter message has been processed by a Diameter application.

20. The system of claim 15 wherein the Diameter AVP is a Diameter Route Record AVP and the unique identifier is a fully qualified domain name (FQDN).

21. The system of claim 15 wherein the Diameter AVP is a vendor specific AVP.

22. The system of claim 15 wherein the screening module is configured for, in response to determining that the first Diameter message does not contain the application status information, providing a second Diameter message to the application.

23. The system of claim 22 wherein the second Diameter message comprises a copy of the first Diameter message, the first Diameter message, a modified first Diameter message, the first Diameter message modified to include the application status information, a new Diameter message, a new Diameter message including information contained in the first Diameter message, or a new Diameter message including information contained in the first Diameter message and the application status information.

24. The system of claim 22 comprising:
a second Diameter node, the second Diameter node comprising:
a communications interface for receiving the second Diameter message; and
the Diameter application for processing the second Diameter message.

25. The system of claim 24 wherein processing the second Diameter message includes sending a third Diameter message to the destination, a third Diameter node, or the first Diameter node.

26. The system of claim 25 wherein the third Diameter message comprises a copy of the second Diameter message, the second Diameter message, a modified second Diameter message, the second Diameter message modified to include application information, the second Diameter message modified to include application information and the application status information, the second Diameter message modified to include application information and lack the application status information, a new Diameter message, a new Diameter message including information contained in the second Diameter message, a new Diameter message including information contained in the second Diameter message and application information, a new Diameter message including information contained in the second Diameter message, application information, and the application status information, or a new Diameter message including information contained in the second Diameter message, application information, and lacking the application status information.

27. The system of claim 25 wherein the first, second, and third Diameter nodes and the destination each comprises a Diameter signaling router (DSR), a Diameter relay agent, a Diameter redirect agent, a Diameter translation agent, a Diameter proxy agent, a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a policy and charging enforcement function (PCEF), a policy and charging rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, or a computing platform.

28. The system of claim 26 wherein the application status information and the application information each includes attribute value pair (AVP) information, parameter information, value information, message header information, or message payload information.

29. A non-transitory computer readable medium having stored thereon executable instructions that when executed by the processor of a computer control the computer to perform steps comprising:
at a first Diameter node:
receiving a first Diameter message that is to be sent to a destination;
determining whether the first Diameter message requires processing by a Diameter application, wherein determining whether the first Diameter message has been processed by the Diameter application includes determining whether the first Diameter message contains application status information, wherein the application status information includes a Diameter attribute value pair (AVP) and wherein the Diameter AVP includes a unique identifier for identifying the Diameter application;
in response to determining that the first Diameter message requires processing by the Diameter application, determining whether the first Diameter message has been processed by the Diameter application; and
in response to determining that the first Diameter message has been processed by the Diameter application, preventing the first Diameter message from being sent to the Diameter application for processing.

* * * * *